April 27, 1954    W. L. STAHL ET AL    2,677,111
SYMMETRICAL RIDGE WAVE GUIDE MATCHING AND COUPLING DEVICE
Filed May 14, 1949                2 Sheets-Sheet 1

WITNESSES:

INVENTORS
William L. Stahl and
Clyde E. Vogeley, Jr.
BY
ATTORNEY

April 27, 1954 W. L. STAHL ET AL 2,677,111
SYMMETRICAL RIDGE WAVE GUIDE MATCHING AND COUPLING DEVICE
Filed May 14, 1949 2 Sheets-Sheet 2

WITNESSES:
N. F. Susser
Marcus W. Dodd

INVENTORS
William L. Stahl and
Clyde E. Vogeley, Jr.
BY Hymen Diamond
ATTORNEY

Patented Apr. 27, 1954

2,677,111

UNITED STATES PATENT OFFICE 2,677,111

SYMMETRICAL RIDGE WAVE GUIDE MATCHING AND COUPLING DEVICE

William L. Stahl, Chicago, Ill., and Clyde E. Vogeley, Jr., Pittsburgh, Pa., assignors to Westinghouse Electric Corporation, East Pittsburgh, Pa., a corporation of Pennsylvania Application May 14, 1949, Serial No. 93,284

2 Claims. (Cl. 333—33)

Our invention relates to waveguides, more particularly to ridged waveguides, and still more particularly to devices for matching and coupling ridged waveguides.

By the term "waveguide" we mean a hollow structure adapted to efficiently convey high frequency electromagnetic wave energy.

By the term "ridged waveguide" we mean a waveguide having a reentrant portion extending into a face of said waveguide, said reentrant portion continuing along the long dimension of said waveguide.

According to the prior art of which we are aware, waveguides have been coupled together by a butt joint or by a choke flange coupling. The butt joint consists of two sections of waveguide joined together so that they become substantially one continuous waveguide. The butt joint has the disadvantage that unless the faces of the waveguides are machined to close tolerances, requiring extremely careful grinding of the surfaces, large losses of power will result. By reason of the peculiar geometry and resulting field configurations of the ridged waveguide, attempts to design a choke flange joint of conventional design have not proven successful. Matching devices for standard waveguides conventionally employ matching stubs inserted in the waveguide and/or sliding sections. The extremely high field concentrations in the center portions of ridged waveguides make the standard techniques impractical. Adjustment is delicate and the high circulating currents which are likely to occur tend to make the sections quite lossy. Sliding probes extending into a waveguide through longitudinal slots in the waveguide have been employed to vary impedances but the field configurations of the ridged waveguide make such slots extremely susceptible to power losses. Moreover, the introduction of such devices increases the level at which voltage breakdown occurs in the guide thereby limiting the usefulness of ridged waveguides.

It is accordingly an object of our invention to provide a coupling that shall have a low reflector coefficient for a ridged waveguide.

Another object of our invention is to produce a coupling for ridged waveguides in which machined surfaces of close tolerance shall not be necessary.

Another object of our invention is to provide a ridged waveguide matching device which shall be readily adjustable.

Another object of our invention is to provide a ridged waveguide matching device which shall not produce a high power loss.

An ancillary object of our invention is to provide a ridged waveguide matching device which shall not reduce the breakdown voltage of the waveguide.

In accordance with one aspect of the present invention, we provide two ridged waveguides at the ends of which the trough formed on the outside by the ridge is filled with a metal conductor. These metal fillers are flush with the end of the waveguides. The waveguides are placed with their ends a short distance apart and so oriented that except for the gap between them, each is substantially a continuation of the other. A sleeve of conducting material is provided which surrounds the waveguides at their junction. The hole through the sleeve into which the waveguides extend is approximately rectangular since at the end of the ridged waveguide the trough formed by the outside of the ridge is filled with metal.

In one embodiment of our invention, the conducting material surrounding the waveguides at the joint may consist of two sleeves. One sleeve is fastened to a first of the waveguides so that the face of the waveguide and the surface of the sleeve are in the same plane. The second waveguide is movable and extends a short distance inside the other sleeve. The two sleeves are then bolted together and the waveguide adjusted to that position at which there are a minimum of reflections from the junction. The second waveguide may then be fastened to its sleeve. As an alternative, the waveguides may be inserted in their respective sleeves and each fastened thereto before bolting the two sleeves together.

It has been found by experimentation that the cavity between the two waveguides can be made to produce the impedance desired to provide for matching between the waveguides and thus minimize reflections.

The quantity of energy escaping from a coupling of this type is less than that which escapes from a choke flange coupling now commonly employed with standard waveguides. Tests with a spectrum analyzer capable of recording any energy loss greater than 90 db below 1 watt were made on applicants' coupling without detecting any loss. Moreover, it has been found that the two sections of waveguide can be rotated relative to each other through several degrees without destroying the match.

In another embodiment of our invention, the surrounding conductor is one continuous sleeve. Here the two waveguides are provided with an adjusting mechanism for varying the distance between them. We thus have an efficient matching device which is readily variable.

In another embodiment of our invention, a variable probe is inserted through the side of the waveguide opposite the reentrant portion of the waveguide into the cavity formed between the waveguides and the sleeve. The distance which the probe extends into the cavity is variable between a position in which it extends only a short distance inside the cavity and a position in which it extends completely through the cavity. It has been found that the use of this probe allows matching of impedances over a greater range.

The novel features that we consider characteristic of our invention are set forth with particularity in the appended claims. The invention itself, however, both as to its organization and its method of operation together with additional objects and advantages thereof will best be read in connection with the accompanying drawing, in which:

The ridged waveguide employed herein is a rectangular waveguide with a longitudinal reentrant portion. This reentrant portion is preferably rectangular. The reentrant portion is filled with an electrically conducting material 8 at the end of the waveguide so as to produce a plane surface in the plane of the face of the waveguide. The conducting material 8 in the trough 6 fills up the trough in such a manner that the outside dimensions of the waveguide at the end are substantially rectangular. In one embodiment of our invention shown in Fig. 4, a sleeve 9 of conducting material is employed. The waveguide is inserted into the sleeve 9 which has a hole therethrough, the cross-section of which hole is substantially congruent to the cross-section of the waveguide near the end thereof. The waveguide is inserted into a first sleeve 9 until the face of the waveguide is in the same plane as the face of the sleeve. The waveguide is then fastened to the sleeve.

Figure 1:
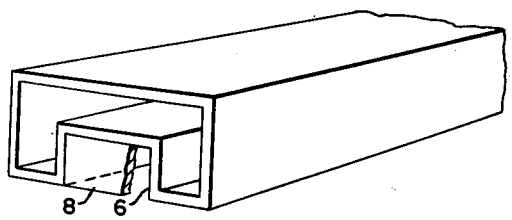
Figure 1 is a view in perspective of a ridged waveguide in accordance with our invention.
Figure 3:
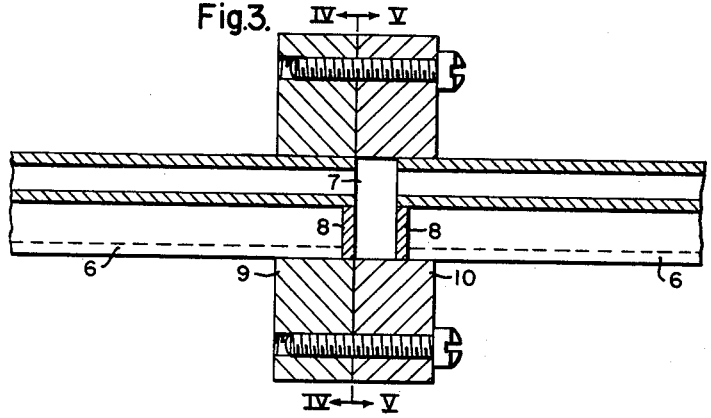
Fig. 3 is a diagram, partly in section, of a junction of two waveguides in another embodiment of our invention.
Figure 4:
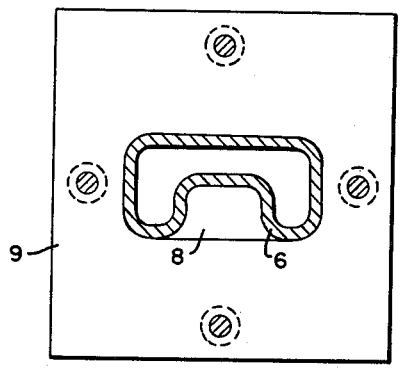
Fig. 4 is a cross-sectional view of the apparatus shown in Fig. 3 taken along the line IV—IV, looking in the direction of the arrows.

In Fig. 3 is shown another sleeve similar in construction to that shown in Fig. 4, and another section of waveguide prepared as shown in Fig. 1 is inserted a short distance into the second sleeve 10. The two sleeves 9, 10 may now be fastened together by bolting, as shown in Fig. 3. The distance which the section of waveguide extends into the second sleeve 10 is varied, thus varying the size of the cavity 7 formed between the two waveguides and the sleeve. Varying the size of this cavity will vary the impedance offered at the junction of the guides and thus by varying the size of the cavity 7, we are able to match the impedances between the waveguides and thus substantially eliminate the reflections at the junction. The production of this junction has been described employing two separate sleeves because of the advantages in manufacturing. However, for the operation of the device this is not necessary and in one embodiment of our invention a single sleeve 10 substantially equal in size to the two sleeves 9, 10 combined together may be employed.

Figure 2:
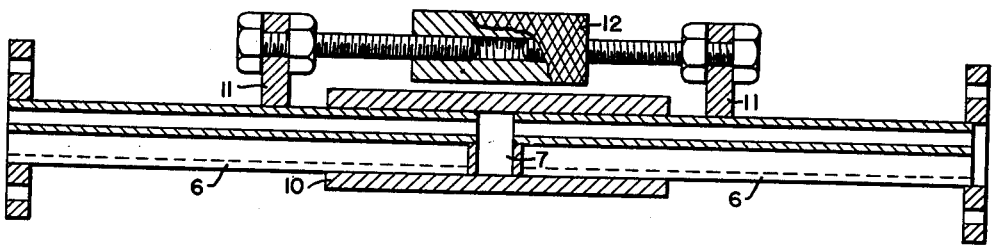
Fig. 2 is a view in section of a preferred embodiment of our invention.
Figure 5:
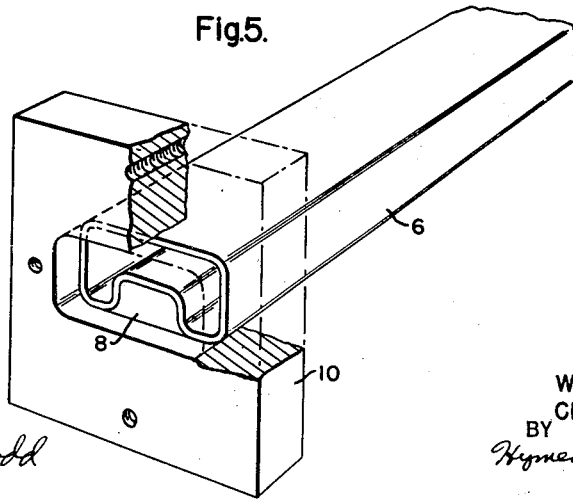
Fig. 5 is a perspective view, partly in section, of the apparatus shown in Fig. 3, the plane being indicated along the line V—V thereof.

In Fig. 2 is shown the apparatus employed in another embodiment of our invention. Here the two waveguides with the reentrant section at the end of the waveguide filled with a conducting material 8 as described above are inserted into a hole in a single sleeve 10. The hole through the sleeve 10 is of a cross-section substantially congruent to the cross-section of the waveguide taken near the end thereof so as to include the filler 8. Each waveguide is thus fitted in the sleeve 10 substantially as shown in Fig. 5. Here, however, the block is considerably longer so as to allow greater variations in the size of the cavity and to add greater stability to the apparatus. A support 11 is fastened to each of the two waveguides and an adjusting device 12 (Fig. 2) is fastened between the supports. This enables us to vary the distance between the two waveguides and thus vary the size of the cavity 7 formed between them. Varying the size of the cavity 7 varies the impedance offered to the oscillations passing down the waveguide. We are thus able to match the impedance of the load to the impedance of the generator.

The operation of this cavity can probably be explained in terms of cancellations due to reflections from the interfaces as well as in terms of impedance of the section of guide introduced between the two sections of rigid waveguide. The mathematical analysis relative to such a device has not been stated to our knowledge. However, the device has been built and tested with satisfactory results.

Figure 6:
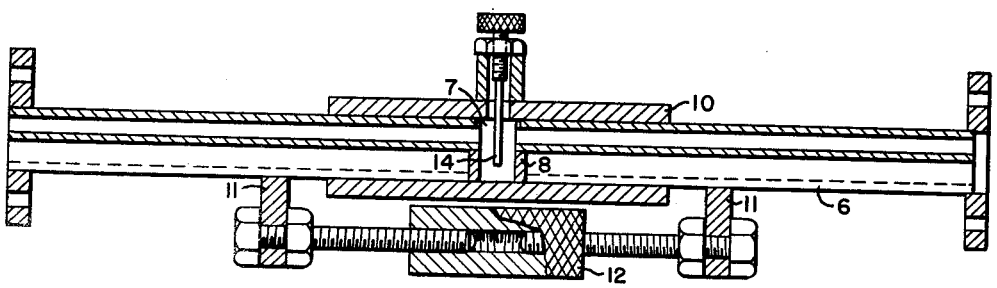
Fig. 6 is a diagram, partly in section, of an impedance matching device with a probe, as employed in one embodiment of our invention.

In Fig. 6 is shown the apparatus employed in still another embodiment of our invention. Here the construction is similar to that shown in Fig. 2, and described above, except that a variable probe 14 is inserted into the cavity 7 formed between the ends of the waveguides and the sleeve. The probe 14 is preferably mounted on the side of the sleeve 10 opposite to the reentrant portion of the waveguide and can be built to extend through that side of the sleeve any desired distance into the cavity. The probe 14 is adjustable so that it can be made to extend to any depth between a short distance inside the cavity and a position such that it extends completely through the cavity. This probe 14 has been found desirable in that it extends the matching range of the device. The addition of the probe also allows adjustment of impedances without changing the size of the cavity 7 between the waveguides.

In this embodiment of our invention, it is preferable to place the mechanism for adjusting the size of the cavity on the opposite side of the waveguide from that on which it is shown in Fig. 2, so that the adjusting mechanism does not hamper the operation of the probe.

In other embodiment of our invention, the probe alone may be used to vary the impedances without adjusting the size of the cavity. In this embodiment, the waveguides may be fastened to the sleeve at the factory and used without an adjusting mechanism.

Although we have shown and described specific embodiments of our invention, we are aware that other modifications thereof are possible. Our invention, therefore, is not to be restricted except insofar as is necessitated by the prior art and the spirit of the invention.

We claim as our invention:

1. In combination, two ridged waveguides so oriented that one is substantially an extension of the other, but separated therefrom by a substantial distance compared to the wave lengths of oscillations to be propagated therein, each of said waveguides having a re-entrant portion and an external trough portion opposite said re-entrant portion, electrically conducting material substantially filling the external troughs opposite the re-entrant portions of said waveguide adjacent the junction of said waveguides, means for connecting said waveguides together comprising a sleeve snugly surrounding an end of each of said waveguides and the conducting material filling the external troughs at the junctions of said waveguides, and means for adjusting said waveguides relative to said connecting means to permit varying the distance between the ends of said waveguides at their junction and thereby vary the impedance presented to oscillations passing from one of the waveguides to the other.

2. In combination, two ridged waveguides so oriented that one is substantially an extension of the other but separated therefrom by a substantial distance compared to the wave length of the oscillations to be propagated therein, each of said waveguides comprising a re-entrant portion and an external trough portion opposite said re-entrant portion, electrically conducting material substantially filling the external troughs formed opposite the re-entrant portion of said waveguides at the junction of said waveguides, a coupling device of electrically conducting material snugly surrounding said waveguides at their junction, and a probe extending into the cavity formed by the adjacent ends of said two ridged waveguides, said electrically conducting material filling said troughs and said electrically conducting coupling device surrounding the adjacent ends of said waveguides for varying the impedance of said cavity to oscillations passing from one of said waveguides to the other of said waveguides.

References Cited in the file of this patent

UNITED STATES PATENTS

| Number | Name | Date |
|---|---|---|
| 686,052 | Golding | Nov. 5, 1901 |
| 1,915,743 | Meerbeck | June 27, 1933 |
| 2,155,508 | Schelkunoff | Apr. 25, 1939 |
| 2,402,663 | Ohl | June 25, 1946 |
| 2,408,420 | Ginzton | Oct. 1, 1946 |
| 2,437,067 | Bingley | Mar. 2, 1948 |
| 2,496,541 | Johnson | Feb. 7, 1950 |
| 2,521,818 | Aron et al. | Sept. 12, 1950 |

FOREIGN PATENTS

| Number | Country | Date |
|---|---|---|
| 503,467 | Great Britain | Acc. Apr. 6, 1939 |

OTHER REFERENCES

Ragan, Microwave Transmission Circuits, vol. 9, Rad. Lab. Series, McGraw Hill Sept. 1948.